Jan. 8, 1924.
V. SCHOLZ
1,480,473
PROCESS FOR THE WORKING UP OF LINOLEUM SCRAPS INTO NEW LINOLEUM
Filed Aug. 8, 1921
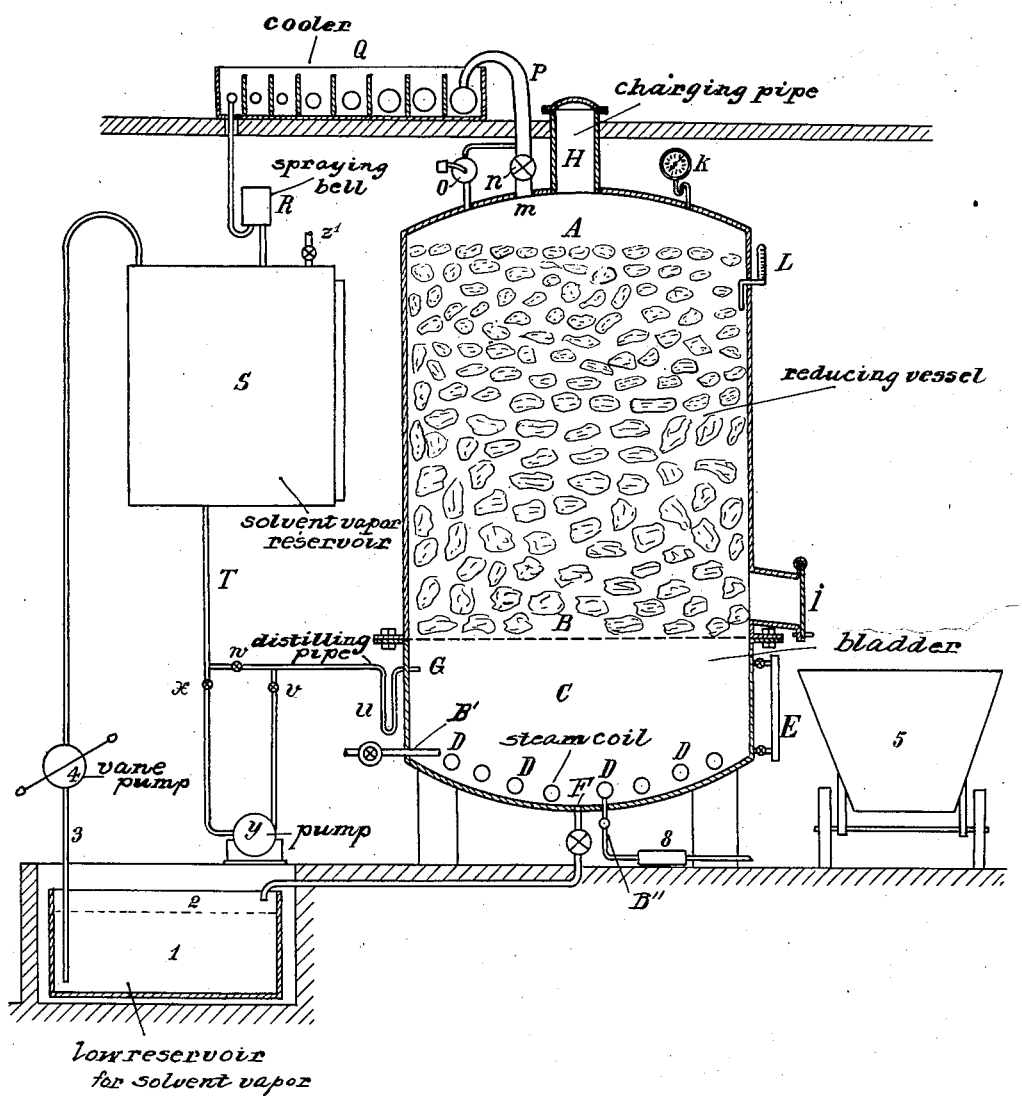
Inventor
V. Scholz
By Marks & Clerk
Atty.

Patented Jan. 8, 1924.

1,480,473

UNITED STATES PATENT OFFICE.

VICTOR SCHOLZ, OF TAUER, GERMANY, ASSIGNOR OF ONE-HALF TO THE FIRM CARL TIEDEMANN, CHEMISCHE WERKE, OF COSWIG-DRESDEN, GERMANY.

PROCESS FOR THE WORKING UP OF LINOLEUM SCRAPS INTO NEW LINOLEUM.

Application filed August 8, 1921. Serial No. 490,766.

*To all whom it may concern:*

Be it known that I, Victor Scholz, of Tauer, Germany, have invented new and useful Improvements in Processes for the Working Up of Linoleum Scraps into New Linoleum, of which the following is a full and exact description.

A process in vogue in linoleum factories consists in grinding scrap linoleum between rollers and adding the ground substance to linoleums of an inferior quality, the so called pressed linoleums. The jute web on the underside of the linoleum is partly ground up with the linoleum, but a part of it is torn off after the linoleum has been steamed prior to the grinding process. A mechanical method of separating the jute fibres and the ground linoleum is described in the German Patent No. 126,026. In this method the light jute fibers is blown out of the ground linoleum in a separating machine. But the ground material then retains only the quality of a non-binding admixture, such as ground cork for instance, because the linoxyn of the linoleum cement is contained in the ground product in an oxidized and dried up state and therefore no longer possesses any binding power.

Another known method consists in resolving scrap linoleum into its constituent substances, i. e. binding and filling substances and textile material, by saponification by means of alkaline solutions or by treating it with organic dissolving agents under pressure in order to recover the valuable varnish (cement) constituents of the scrap which are completely dissolved in organic dissolving agents, whereupon the solution is separated from the residues (ground cork, colouring matter, jute) by filtration and after the dissolving agent has been distilled off, a yellowish brown oil is obtained that can be used as a finishing, dressing or glazing agent, as spinning oil, and as a varnish.

The extracted liquid oil cannot be immediately used for the production of linoleum. It is liquid and not of the hard, resistive, sticky and binding nature that characterizes fresh linoleum cement which only commences to soften at 80 to 100° Celsius.

In distinction from the extraction of the cement from the scrap linoleum by dissolving it with large quantities of organic dissolving agent that leave an extract in the form of a yellowish brown oil, the present invention consists in softening the hard scraps with small quantities of organic dissolving agents by depolymerism of the linoxyn or cement, so that the softened crummy mass to which the scraps are reduced can be driven through sieves, by which the undesirable jute fibres are retained.

In accordance with the invention a quantity of, say, 100 kgs. of scrap is softened with the aid of 50 kgs. of dissolving agent in such a manner that the crummy mass when brushed through sieves separates into 95 kgs. of linoleum pulp (cork, colouring matter, cement) and 5 kgs. of jute fibre.

The organic solvents depolymerize the linoxyn and convert it into a soft substance which contains products of decomposition of the oxyacids of the linoxyn and the cement. If these products of decomposition, that amount to about 10% of the cement, are driven off by heat, the softened cement will polymerize again and become firm and agglutinant. The driving off of these products of decomposition from the linoleum pulp that has been freed of jute and that amounts to 95% of the scraps is easily and quickly accomplished at a low temperature as the cement only forms 30 to 35 parts of the linoleum pulp and is therefore finely divided and presents a large surface for evaporation in the cork mixture.

The production of fresh linoleum according to the invention takes place in a continuous process. About 5 kgs. of jute fibres are separated from 100 kgs. of scraps; the 90–95 kgs. of regenerated linoleum pulp is repolymerized and, when calendered in a warm state onto a suitable web, forms a useful linoleum whose colour depends upon the mixture of the colours of the scraps.

The process is carried out by treating the broken up or cut up scraps or pieces of linoleum at a warm temperature with small quantities of organic solvent. According to the kind of solvent used the scraps may either be merely heated up at the back flow cooler of the stirring device, or they are prepared for further use by being subjected to pressure and heat in a stirring autoclave at temperatures that exceed the boiling point of the solvent used, but which are not high enough to char the ground cork or to change its colour.

The softened mass is then driven through separating devices or sieves which hold back the jute fibres whilst the finely granulated, soft, mass which has thus been prepared for further treatment passes through the sieve. Prior to the sifting process the solvent may or may not be partly or completely distilled off and recovered as the case may be. Care must be taken to prevent any appreciable loss of solvent occurring in this separation process. Portions of the solvent that may have remained in the regenerated mass are recovered in the heatable stirring or kneading machines and the mass is kept for a while at temperatures of 100 to 120° Celsius when a repolymerization of the depolymerized linoxyn will occur and a tough binding cement is formed again in the prepared mass. This treatment can, of course, also be carried out upon stands in heated rooms or in heatable vacuum desiccating boxes or vacuum kneading machines. The regenerated mass may be immediately remixed, rolled and scratched, and calendered onto a web of jute or paper; with the aid of the usual appliances employed in the manufacture of linoleum, or it may be used as an admixture for linoleum pulp that has been made with fresh linoleum cement.

*Example I.*

1000 kgs. of scrap linoleum broken or cut into pieces of the size of the hand are heated with about 500 kgs. of methylated spirits in a heatable stirring autoclave for about 2 hours to a temperature of 80 to 140° Celsius, which will result in their reduction to a soft, fine crummy pulp. The solvent vapor is then turned off, the atmospheric pressure restored, and the spirits distilled off to be recovered. The soft pulp is now fed onto vibrating sieves which separate the jute from the regenerated substance, this latter being then caused to repolymerize at temperatures of 100 to 120°.

*Example II.*

1000 kgs. of scrap linoleum with 600 kgs. of ethylene trichloride are heated for 5 hours in a stirring apparatus at the back flow cooler and whereupon the ethylene trichloride is recovered by vacuum distillation. The residual substance is brushed through stirring sieves that hold back the jute fibres and then heated for 5 hours in a vacuum chest to a temperature of about 120° when the repolymerism of the linoxyn will take place.

*Example III.*

1000 kgs. of scrap linoleum with 150 kgs. of spirits and 150 kgs. of benzoline are heated for 3 hours in a stirring autoclave to a temperature of 120 to 140° Celsius. The softened material is then fed onto sifting worms provided with cooling devices. The sifting worms separate the jute fibres and feed the fine, crummy, soft regenerated substance into a vacuum kneading machine in which the solvent is distilled off. When this has been completely recovered the regenerated substance is treated in the vacuum machine for about another 2 hours at 100 to 130° in order to bring about the repolymerism of the lynoxyn.

In employing small quantities of organic solvents for producing the softening of scrap linoleum, that is necessary for regeneration and for its separation from the jute web at its under side, it has been found that the said softening is easier to accomplish if the scrap is subjected to steaming or compressed solvent vapor of the organic solvents, as this reduces the amount of solvent consumed to a minimum.

The solvents adapted for this purpose include all organic volatile solvents or mixtures of the same that are capable of dissolving linoxyn and linoleum cement and whose vapours or mixed vapours have a temperature that is beneath the temperature at which the valuable cork is decomposed.

It is known that when mixed solvents are present the vapours of the solvents with low boiling points carry the solvents with higher boiling points along with them and thus enable solvents, such as tetrahydro naphthaline and the like, whose boiling points exceed 140°· Celsius, to be used together with the solvent first mentioned.

A manner of carrying out the process is illustrated in the drawing.

The reducing or preparing vessel A filled with scrap linoleum is openly connected through the sieve bottom B with the bladder C in the manner of a potato steamer. The bladder and the vessel are designed for an internal pressure of 5 atmospheres in order to permit of the acceleration of the preparing process in the cases of some solvents.

The bladder C is equipped with a steam coil D, a gauge glass E, a discharge pipe F and a charging pipe G. A steam inlet B' into the coil D and a steam outlet B'' to the condensing vessel 8 are also provided.

The preparing vessel A has a charging pipe H, a discharge pipe I, a pressure gauge K, a thermometer L, a cooling pipe M with a stop cock N, and a safety valve O, which is arranged to blow off into the open cooling pipe P when the process is carried out under pressure. In carrying out the preparing process without the application of pressure the condensed solvent vapor returns through the pipe P, the cooler Q, spraying bell R, reservoir S, pipe T, distilling pipe U into the bladder C in the form of a solvent. If, on closing the cock N, the process is carried out with pressure in the preparing vessel A, the solvent vapor blown off through the safety valve is condensed in a similar manner and caught up in the reservoir S. In reducing the scrap under pressure the bladder C is supplied by the pump Y, the cock W being closed and the cocks X and V open. The air cock Z of the reservoir S is open during working.

A low reservoir 1 with a sieve 2 is provided for occasional evacuations of the bladder through the cock F, the sieve operating to retain dirt. The solvent may be collected through the pipe 3 by means of the vane pump 4 and accumulated in the reservoir S. The truck 5 is provided for the reception of the softened scraps.

When the scraps have been softened by steaming, the steam is shut off at B', and the substance discharged through the pipe B''. The soft scraps are now fed onto sifting worms which allow the soft basic linoleum pulp (cement, cork, colouring matter) to percolate through them and discharge the jute fibres, that roll up into balls, through the mouthpiece. The jute fibres and basic linoleum pulp are freed from the adhering solvent in a vacuum chest or a vacuum kneading machine, and the solvent is recovered. The basic linoleum pulp, when regenerated, is worked up into fresh linoleum.

Having thus fully described the invention what is claimed as new and desired to be secured by Letters Patent is:

1. In a process for working up scrap linoleum of all kinds into new lincleum by treating the scrap with organic solvents, the using of so small a quantity of organic solvents that a mere softening of the scrap occurs which renders it possible to remove the jute fibres by a mechanical means, after which the regenerated basic linoleum pulp is reconverted into new linoleum.

2. In a process of the kind claimed in claim 1, applying heat to the basic linoleum pulp that has been freed of the fibres in order to regenerate the linoxyn contained in the pulp and to restore the qualities of firmness, toughness and glutinousness to the soft depolymerized linoxyn.

In testimony whereof I affix my signature.

VICTOR SCHOLZ.